June 6, 1967  G. L. GUINOT  3,323,666

MECHANICAL GROUND LEVELLING MACHINE

Filed Sept. 3, 1965

INVENTOR
GABRIEL L. GUINOT
BY
Mason, Fenwick & Lawrence
ATTORNEYS

United States Patent Office 3,323,666
Patented June 6, 1967

3,323,666
MECHANICAL GROUND LEVELLING MACHINE
Gabriel L. Guinot, Le Plessis-Belleville, France, assignor to Societe anonyme Poclain, Le Plessis-Belleville, France, a French society
Filed Sept. 3, 1965, Ser. No. 484,885
Claims priority, application France, Sept. 24, 1964, 989,115
6 Claims. (Cl. 214—138)

This invention relates to mechanical ground levelling or grading machines of the kind provided with an hydraulically operated shovel bucket or like implement or tool, capable of being moved over the ground whilst fully maintaining a substantially constant orientation. Machines of this kind include an implement or tool, articulated at the end of an arm, oscillating on a jib by means of an hydraulic ram.

In such machines a rod, having a length substantially equal to that of the arms is connected to the jib and to the implement so as to provide a parallelogram capable of parallel motion ensuring that the orientation of the implement during the course of oscillation of the arm, is maintained. The control of the oscillation of the working implement on the beam, particularly for discharging material contained in the implement, is effected by means of a ram disposed in the neighbourhood of the implement, for example, on the rod referred to.

Such arrangements for controlling the working implement have, however, the disadvantage of permitting only a limited pivotal movement or rotation of the implement on the beam. Furthermore the ram for controlling the rotation of the implement on the beam is very vulnerable due to its proximity to the ground.

The object of the present invention is to overcome these disadvantages by providing an improved implement control means occupying very little space.

With this object in view the invention consists of a mechanical ground levelling or grading machine comprising, a beam oscillatable on a job by means of a ram and having articulated thereto a working implement and parallel motion lever mechanism for controlling the movement of said implement, wherein said control mechanism comprises a two arm or bell-crank lever pivotally mounted at its apex to said jib about the axis of oscillation of said beam and pivotally connected by one of its arms to a ram, preferably mounted on said jib, each arm of said bell-crank lever being pivotally connected to one end of a link equal in length to that of said beam and each of said links being parallel to the longitudinal axis of said beam and pivotally connected at its other end to the implement.

In order that the invention may be more clearly understood one particular embodiment thereof will now be described, by way of example, with reference to the accompanying drawings in which.

Figure 1:
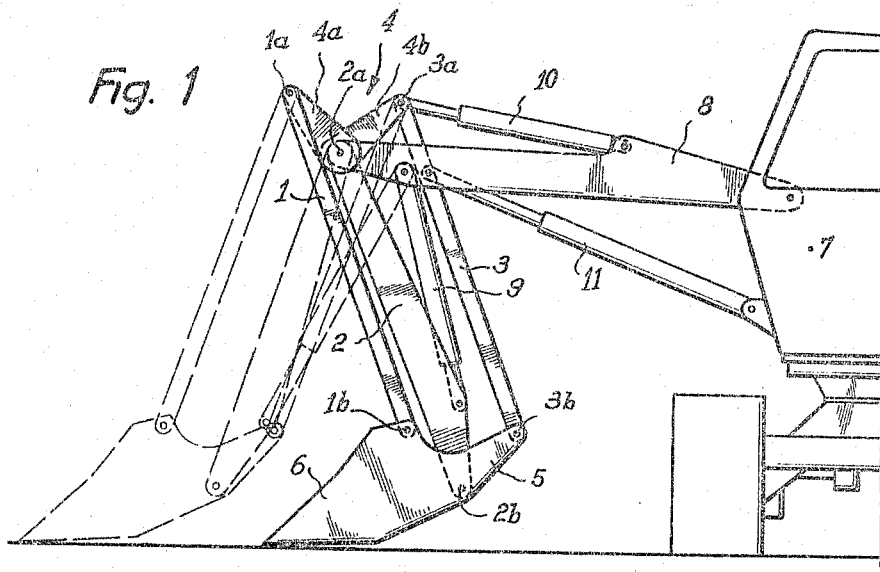
FIGURE 1 is a diagrammatic side view of a hydraulic leveler or grader, equipped with control means according to the invention.

Referring to these drawings the machine comprises a turret 7 on which is pivotally mounted a jib 8 whose pivotal movements are controlled by an hydraulic ram 11. A beam 2 is articulated at 2a to the end of the jib 8 and is controlled by an hydraulic ram 9 and supports at one end a shovel or bucket 6 (hereinafter referred to as an implement) pivotal about an axis 2b.

A bell crank lever 4 comprising two arms 4a and 4b, substantially at right angles to one another, is pivotally mounted at its apex on the jib also about the pivotal axis 2a of the beam. An hydraulic ram, i.e. preferably double acting, is pivotally connected at one end to the arm 4b of the bell crank lever and at its other end to the jib at a point intermediate the ends of said jib and permits control of the rotation of the said lever as well as its immobilisation with respect to the jib. If desired, another lever articulated to the jib and a return link, may be interposed between the lever 4 and the jack 10, allowing in known manner considerable rotation of the bell crank lever 4 to be obtained for a moderate stroke of the jack 10.

Two parallel links 1 and 3 are attached one to each arm 4a and 4b of the lever 4 at 1a and 3a respectively and to the implement 6 at 1b and 3b respectively. The distance between the axes 1a, 1b and 3a, 3b of the links 1 and 3 is equal to the distance between the axes 2a, 2b of the beam 2 and these two links are arranged parallel to each other and to the longitudinal axis 2a–2b of the beam. Furthermore, the arms 4a and 4b of the lever 4 and the links 1 and 3 attached respectively to them, are displaced transversely with respect to each other to allow the lever 4 complete freedom to pivot about the axis 2a. In practice, it is sufficient to arrange the links 1 and 3 on each side of the lever 4 so that it will not contact the axis 2a during rotation of said lever. Thus, the connection between the jib 8 and the implement 6 is itself constituted by a unit of two parallelograms capable of parallel motion. This arrangement permits, as is well known, a practically constant inclination of the implement with respect to the ground to be obtained, during the course of oscillation of the beam on the jib.

The operation of the machine is, therefore, as follows: the ram 10 being locked and the ram 11 being free to extend or retract, the alternative control of ram 9 produces the oscillation of the beam 2 and the carrying out of the job of levelling or grades (FIGURE 1).

Figure 2:
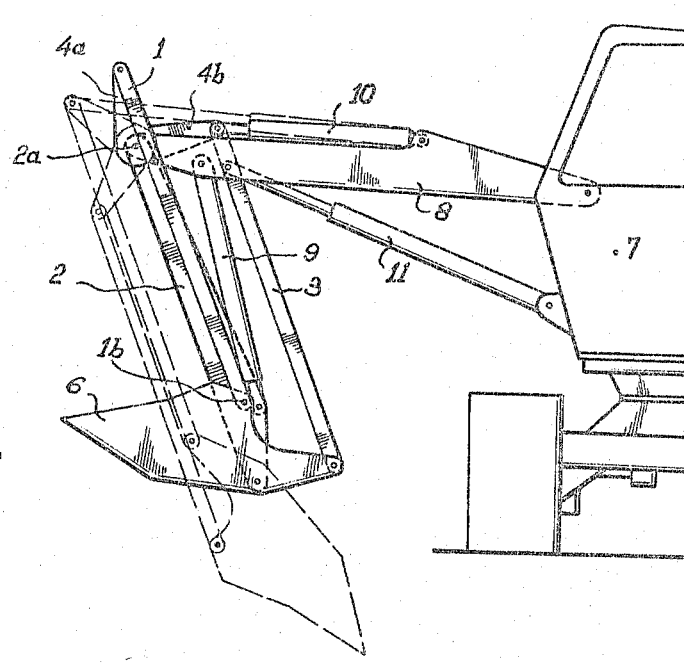
FIGURE 2 is a view similar to FIGURE 1 and showing the implement in its innermost position.

When it is desired to discharge the material contained in the implement 6, the ram 10 is extended (FIGURE 2a) which produces swinging of the implement on the beam. It will be noted, however, that even in the case where one of the links 1 or 3 happens to cut or cross the axis 2a and 2b of the beam, pivoting of the implement is always guaranteed by the other link from the lever 4. Thus, the unloading angle of the implement can be very large without the risk of locking the control arrangement.

The invention is not limited to the particular embodiment herein described and shown, but may be modified without departing from the scope of the invention as defined in the appended claims, for example the arms 4a, 4b of the levers 4 may be of equal or unequal lengths as a function of space requirements and may be disposed at an angle different from 90°. It must also be understood that the control ram 10 is remote from implement which reduces its vulnerability during working.

I claim:

1. A mechanical ground levelling machine comprising a beam oscillatable on a jib by means of a ram, a working implement articulated to said beam, parallel motion lever mechanism for controlling the movement of said implement, said mechanism comprising a two-arm lever having first and second arms and being pivotally mounted intermediate its arms to said jib about the axis of oscillation of said beam, a ram pivotally connected to the first arm of said two-arm lever, a first link pivotally connected at one of its ends to the first arm of said two-arm lever and at its opposite end to said working implement, a second link connected at one of its ends to the second arm of the lever and at its opposite end to said working implement, said links being equal in length to that of said beam and parallel to the longitudinal axis of said beam.

2. A mechanical ground levelling machine comprising a beam oscillatable on a jib by means of an hydraulic ram, a working implement articulated to said beam, parallel motion lever mechanism for controlling the movement of said implement, said mechanism comprising a bell-crank lever having first and second arms and being pivotally mounted at its apex to said jib about the axis of oscillation of said beam, a hydraulic ram pivotally connected between the first arm of said bell-crank lever and said jib, a first link pivotally connected at one of its ends to the first arm of said bell-crank lever and at its opposite end to said working implement, a second link connected at one of its ends to the second arm of the bell-crank lever and at its opposite end to said working implement, said links being equal in length to that of said beam and parallel to the longitudinal axis of said beam.

3. A mechanical levelling machine according to claim 1, wherein the arms of said two-arm lever are of equal length.

4. A mechanical levelling machine according to claim 1, wherein the arms of said two-arm lever are disposed at right angles to each other.

5. A mechanical levelling machine according to claim 2, wherein the arms of said bell-crank lever are of equal length.

6. A mechanical levelling machine according to claim 2, wherein the arms of said bell-crank lever are disposed at right angles to each other.

References Cited

UNITED STATES PATENTS 3,080,076  3/1963  Randall ------------ 214—138

FOREIGN PATENTS 669,368  8/1963  Canada.

HUGO O. SCHULZ, *Primary Examiner.*